US010665035B1

(12) United States Patent
Perkins

(10) Patent No.: US 10,665,035 B1
(45) Date of Patent: May 26, 2020

(54) SYSTEM AND PROCESS OF USING PHOTOGRAMMETRY FOR DIGITAL AS-BUILT SITE SURVEYS AND ASSET TRACKING

(71) Applicant: B+T GROUP HOLDINGS, INC., Tulsa, OK (US)

(72) Inventor: Walter James Perkins, Tulsa, OK (US)

(73) Assignee: B+T Group Holdings, LLC, Tulsa, OK (US)

( * ) Notice: Subject to any disclaimer, the term of this patent is extended or adjusted under 35 U.S.C. 154(b) by 43 days.

(21) Appl. No.: 16/033,188

(22) Filed: Jul. 11, 2018

Related U.S. Application Data

(60) Provisional application No. 62/531,182, filed on Jul. 11, 2017.

(51) Int. Cl.
*G06T 19/20* (2011.01)
*G06T 7/73* (2017.01)
(Continued)

(52) U.S. Cl.
CPC .............. *G06T 19/20* (2013.01); *G01C 11/10* (2013.01); *G01C 11/28* (2013.01); *G06T 3/4038* (2013.01);
(Continued)

(58) Field of Classification Search
CPC ........ G06T 7/74; G06T 19/20; H04N 5/23238
See application file for complete search history.

(56) References Cited

U.S. PATENT DOCUMENTS 1,713,498 A  5/1919 Cooke
5,699,444 A  12/1997 Palm
(Continued)

FOREIGN PATENT DOCUMENTS

DE  102 41 752 A1  3/2004
JP  20000131065 A  5/2000
(Continued)

OTHER PUBLICATIONS

Jeyapalan, et al., "As Built Surveys of Road side Features for GIS, Visualization, and Virtual Reality", Int'l Archives of Photogammetry and Remote Sensing, pp. 406-413, vol. XXXIII, Part B5, Amsterdam 2000.
(Continued)

*Primary Examiner* — Matthew Salvucci
(74) *Attorney, Agent, or Firm* — Crowe & Dunlevy, P.C.

(57) ABSTRACT

The invention relates to a system and process for generating a two-dimensional stitched and annotated digital image of a site having at least one as-built structure thereon. The process includes acquiring a plurality of digital images, still frames and/or video images of the site, the structure, or both, with each of the digital images including one or more reference objects positioned on or about the site, the structure, or both. The reference objects are configured to accurately scale and orient each of the digital images. The process photogrammetrically generates a three-dimensional point cloud from the digital images, and one or more reference objects and features of interest are identified in the three-dimensional point cloud. Based on the identified reference objects and features, the process and system generates the two-dimensional stitched and annotated digital image of the site and/or the structure.

21 Claims, 9 Drawing Sheets

(51) Int. Cl.
*H04N 5/232* (2006.01)
*G06T 3/40* (2006.01)
*G01C 11/10* (2006.01)
*G01C 11/28* (2006.01)
*G06T 5/00* (2006.01)
*G06T 3/60* (2006.01)

(52) U.S. Cl.
CPC ........... *G06T 7/74* (2017.01); *H04N 5/23238* (2013.01); *G06T 3/40* (2013.01); *G06T 3/60* (2013.01); *G06T 5/006* (2013.01); *G06T 2207/10028* (2013.01); *G06T 2207/10032* (2013.01); *G06T 2207/30184* (2013.01); *G06T 2219/004* (2013.01)

(56) References Cited

U.S. PATENT DOCUMENTS

| | | | |
|---|---|---|---|
| 6,108,497 | A | 8/2000 | Nakayama et al. |
| 6,304,669 | B1 | 10/2001 | Kaneko et al. |
| 6,339,683 | B1 | 1/2002 | Nakayama et al. |
| 6,650,764 | B1 | 11/2003 | Wakashiro |
| 6,693,650 | B2 | 2/2004 | Wakashiro et al. |
| 6,717,683 | B1 | 4/2004 | Wakashiro et al. |
| 6,757,445 | B1 | 6/2004 | Knopp |
| 6,901,161 | B1 | 5/2005 | Wakashiro |
| 6,990,215 | B1 | 1/2006 | Brown et al. |
| 7,398,928 | B2 | 7/2008 | Gaspard et al. |
| RE41,175 | E | 3/2010 | Vashisth et al. |
| 8,559,702 | B2 | 10/2013 | Kochi et al. |
| 8,897,541 | B2 | 11/2014 | Weisenburger et al. |
| 9,007,461 | B2 | 4/2015 | Ohtomo et al. |
| 9,013,576 | B2 | 4/2015 | Ohtomo et al. |
| 9,596,617 | B2 | 3/2017 | Priest et al. |
| 9,654,984 | B2 | 5/2017 | Priest et al. |
| 9,704,292 | B2 | 7/2017 | Priest et al. |
| 9,764,838 | B2 | 9/2017 | Priest |
| 9,928,750 | B2 | 3/2018 | Priest |
| 2003/0103651 | A1 | 6/2003 | Novak |
| 2004/0233461 | A1 | 11/2004 | Armstrong et al. |
| 2007/0153297 | A1 | 7/2007 | Lau |
| 2014/0146173 | A1 | 5/2014 | Joyce et al. |
| 2015/0022656 | A1 | 1/2015 | Carr et al. |
| 2016/0309337 | A1 | 10/2016 | Priest et al. |
| 2016/0309341 | A1 | 10/2016 | Priest et al. |
| 2016/0320775 | A1 | 11/2016 | Priest |
| 2016/0323146 | A1 | 11/2016 | Priest |
| 2016/0360428 | A1 | 12/2016 | Priest |
| 2016/0362180 | A1 | 12/2016 | Priest |
| 2016/0375984 | A1 | 12/2016 | Priest |
| 2017/0024929 | A1 | 1/2017 | Priest |
| 2017/0046873 | A1 | 2/2017 | Terry et al. |
| 2017/0134963 | A1 | 5/2017 | Priest |
| 2017/0142596 | A1 | 5/2017 | Priest et al. |
| 2017/0215086 | A1 | 7/2017 | Priest |
| 2017/0257778 | A1 | 9/2017 | Priest |
| 2017/0318477 | A1 | 11/2017 | Priest |
| 2017/0345139 | A1 | 11/2017 | Hummer et al. |
| 2017/0355457 | A1 | 12/2017 | Terry et al. |
| 2017/0358212 | A1 | 12/2017 | Godwin et al. |
| 2017/0358213 | A1 | 12/2017 | Priest |
| 2017/0358215 | A1 | 12/2017 | Priest |
| 2017/0358216 | A1 | 12/2017 | Priest |
| 2017/0358217 | A1 | 12/2017 | Priest |
| 2017/0358223 | A1 | 12/2017 | Priest |
| 2017/0358224 | A1 | 12/2017 | Priest |
| 2017/0358225 | A1 | 12/2017 | Priest |
| 2017/0358228 | A1 | 12/2017 | Priest |
| 2017/0366751 | A1 | 12/2017 | Terry et al. |
| 2017/0366980 | A1 | 12/2017 | Priest et al. |
| 2018/0009102 | A1 | 1/2018 | Priest et al. |
| 2018/0026708 | A1 | 1/2018 | Priest |
| 2018/0034017 | A1 | 2/2018 | Erickson et al. |
| 2018/0034022 | A1 | 2/2018 | Hummer et al. |
| 2018/0034036 | A1 | 2/2018 | Perry et al. |
| 2018/0034068 | A1 | 2/2018 | Perry et al. |
| 2018/0041907 | A1 | 2/2018 | Kanahama |
| 2018/0044154 | A1 | 2/2018 | Priest |
| 2018/0047994 | A1 | 2/2018 | Perry et al. |
| 2018/0075649 | A1 | 3/2018 | Godwin et al. |
| 2018/0086483 | A1 | 3/2018 | Priest et al. |

FOREIGN PATENT DOCUMENTS

| | | |
|---|---|---|
| JP | 4282361 B2 | 6/2009 |
| JP | 2014066538 A | 4/2014 |
| WO | 2008152740 A1 | 11/2008 |

OTHER PUBLICATIONS

Klein, et al., "Image-based verification of as-built documentation of operation buildings," Automation in Construction, Jun. 21, 2011, vol. 21, pp. 161-171, U.S.

Schindler, et al., "Recent Developments in Large-scale Tie-point Search", ISPRS Journal of Photogrammetry and Remote Sensing, vol. 115, p. 47-62, May 2016.

SYSTEM AND PROCESS OF USING PHOTOGRAMMETRY FOR DIGITAL AS-BUILT SITE SURVEYS AND ASSET TRACKING

CROSS-REFERENCE TO RELATED APPLICATIONS

This application claims the benefit of U.S. Provisional Patent Application Ser. No. 62/531,182 filed on Jul. 11, 2017, and incorporates said provisional application by reference into this document as if fully set out at this point.

BACKGROUND OF THE INVENTION

1. Field of the Invention

This invention relates generally to computer assisted systems and processes of using photogrammetry for digital as-built site surveys and asset tracking.

2. Description of the Related Art

Conducting site surveys and the production of as-built models and drawings is a labor-intensive task that often involves the use of specialized software. Although as-built site surveys are used in many fields, they are typically produced by architects, engineers, drafters, and artists who have been specially trained to produce precision drawings for use in manufacturing, engineering, design, etc.

Of particular interest for purposes of the instant disclosure is the production of digital as-built models and drawings that are representative of large sites and structures, such as buildings, street views, processing plants, telecommunication towers, etc., and that contain sufficient information and detail, such as for operations, maintenance, asset tracking or the like. In such cases, it may be difficult or impossible to obtain the numerous individual measurements that would be necessary to fully represent the structure in digital, three-dimensional as-built models and drawings. For example, in some cases physical access to the structure is totally or partially limited (e.g., if the structure if a large tower it may be impractical to climb to the top of it) or dangerous (e.g., if the structure is an operating refinery certain areas may be cordoned off during operations).

It is therefore desirable to provide computer assisted systems and processes of using photogrammetry for digital as-built site surveys and asset tracking that overcomes the disadvantages of the prior art.

It is further desirable to provide a computer assisted system and process of using photogrammetry that uses two-dimensional images to create three-dimensional models and drawings, which are converted to two-dimensional digital as-built site surveys and asset tracking.

Before proceeding to a detailed description of the invention, however, it should be noted and remembered that the description of the invention which follows, together with the accompanying drawings, should not be construed as limiting the invention to the examples (or embodiments) shown and described. This is so because those skilled in the art to which the invention pertains will be able to devise other forms of this invention within the ambit of the appended claims.

SUMMARY OF THE INVENTION

In general, in a first aspect, the invention relates to a computer-implemented process for generating a two-dimensional stitched and annotated digital image of a site having at least one as-built structure thereon. The structure may be a telecommunications tower, a refinery, a bridge, a street scene, an architectural work, or the like. The process includes acquiring a plurality of digital images, still frames and/or video images of the site, the structure, or both the site and the structure, with each of the digital images including one or more reference objects positioned on or about the site, the structure, or both. The reference objects are configured to accurately scale and orient each of the digital images. The process then photogrammetrically generates a three-dimensional point cloud of the site and/or the structure from the digital images, and one or more reference objects and features of interest are identified in the three-dimensional point cloud. Based on the identified reference objects and features, the process then generates the two-dimensional stitched and annotated digital image of the site and/or the structure.

The process can also include placing each of the reference objects on or around the site and/or the structure in a manner that each of the reference objects is captured in some or all of the digital images acquired of the site and the structure. The reference objects may be color coded, with a predetermined length and orientation, and have one or more measurement marks thereon.

The process can also include the steps of electronically selecting common feature points in two or more of the digital images, calculating camera positions, orientations, and distortions, and then generating a first three-dimensional point cloud of the site and/or the structure in the digital images. Additionally, the process can include densifying, leveling and orienting the first three-dimensional point cloud based on the identified reference objects, on the identified features, on one or more identified tie points, or a combination thereof to generate a second three-dimensional point cloud. The two-dimensional digital image can be generated by electronically stitching the digital images together based on the identified reference objects and/or the identified features in the second three-dimensional point cloud, electronically annotating the second three-dimensional point cloud with actual dimensions and other information specifically relating to the site and/or the structure, and then electronically flattening the annotated second three-dimensional point cloud to produce the two-dimensional stitched and annotated digital image for sequential viewing.

In general, in a second aspect, the invention relates to a computer-implemented process of using photogrammetry for generating a two-dimensional stitched and annotated digital image. The process includes the following steps:

a. selecting a site having at least one as-built structure thereon;

b. providing one or more reference objects configured to be placed on or around the site, the structure, or both the site and the structure;

c. acquiring a plurality of digital images, still frames and/or video images of the site, the structure, or both the site and the structure; some or all of the plurality of digital images including at least one of the reference objects; each of the reference objects configured to accurately scale and orient each of the plurality of digital images of the site, the structure, or both the site and the structure;

d. electronically communicating the plurality of digital images to a central server;

e. generating a first three-dimensional point cloud of the site, the structure, or both the site and the structure in the digital images;

f. identifying one or more of the reference objects in the first three-dimensional point cloud;

g. identifying one or more features of the site, the structure, or both the site and the structure in the first three-dimensional point cloud;

h. generating a second three-dimensional point cloud based on the identified one or more reference objects in the first three-dimensional point cloud, on the identified one or more features of the site, the structure, or both the site and the structure in the first three-dimensional point cloud, or a combination thereof; and i. generating the two-dimensional stitched and annotated digital image of the site, the structure, or both the site and the structure from the second three-dimensional point cloud.

Similar to the first aspect of the invention, the structure may be a telecommunications tower, a refinery, a bridge, a street scene, an architectural work, or a combination thereof. The digital images can be acquired manually or using an unmanned aerial vehicle with substantial overlap (i.e., about 90% overlap) between successive digital images, still frames and/or video images.

The process may also include placing each of the reference objects on or around the site and/or the structure such that each of the reference objects is captured in the digital images. The reference objects can be color coded, with a predetermined length and a predetermined orientation, and with one or more measurement marks thereon.

The process can further include electronically calibrating and correcting the digital images for tilt, exposure, distortion, or a combination thereof. The digital images can be photogrammetrically processed by electronically selecting common feature points in two or more of the digital images, calculating camera positions, orientations, and distortions, and generating the first three-dimensional point cloud of the site, the structure, or both the site and the structure in the digital images. The first three-dimensional point cloud can then be leveled and oriented based on the identified reference objects, on the identified features, on one or more identified tie points, or a combination thereof in order to generate a second three-dimensional point cloud.

In order to generate the two-dimensional stitched and annotated digital image, the process can electronically stitching the digital images together based on the identified reference objects and/or features in the second three-dimensional point cloud, electronically annotating the second three-dimensional point cloud with actual dimensions and other information specifically relating to the site and/or the structure, and then electronically flattening the annotated second three-dimensional point cloud to the two-dimensional stitched and annotated digital image for sequential viewing. The two-dimensional stitched and annotated digital image may be viewable on an internet browser of a mobile device or a computer, and can also include electronic hyperlinks for additional informational details of the site and/or the structure.

The foregoing has outlined in broad terms some of the more important features of the invention disclosed herein so that the detailed description that follows may be more clearly understood, and so that the contribution of the instant inventors to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

BRIEF DESCRIPTION OF THE DRAWINGS

These and further aspects of the invention are described in detail in the following examples and accompanying drawings.

DETAILED DESCRIPTION OF THE INVENTION

Figure 1:
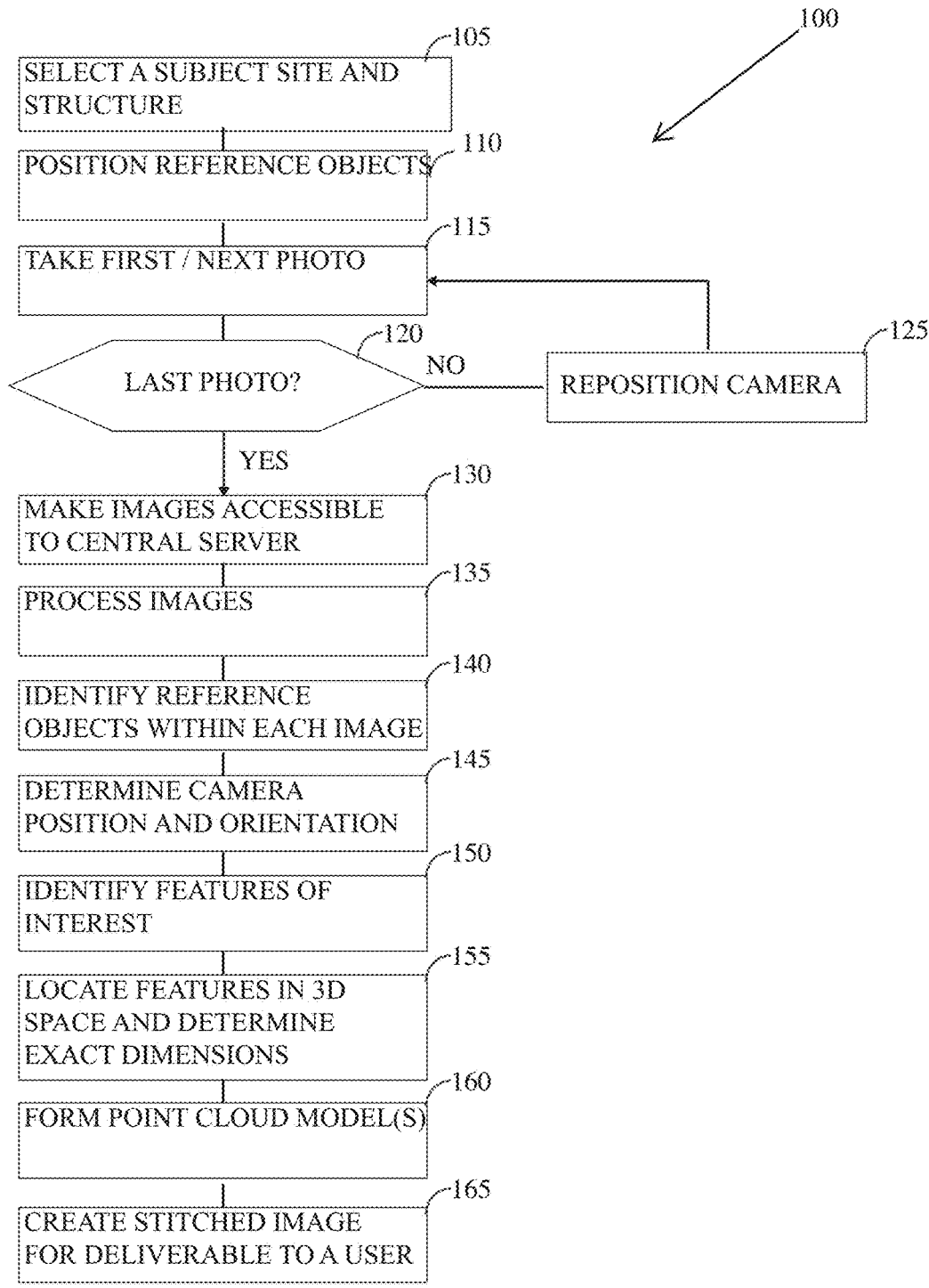
FIG. 1 is a flow chart illustrating an operating logic suitable for use in accordance with an illustrative embodiment of the invention disclosed herein.

While this invention is susceptible of embodiment in many different forms, there is shown in the drawings, and will herein be described hereinafter in detail, some specific embodiments of the instant invention. It should be understood, however, that the disclosure is to be considered an exemplification of the principles of the invention and is not intended to limit the invention to the specific embodiments or algorithms so described.

This invention relates generally to computer assisted systems and processes of using photogrammetry for digital as-built site survey and asset tracking. The inventive system and process uses photogrammetry to derive geometric (distances and dimensions) and other information about a site having a subject structure through measurements made on images.

Figure 2:
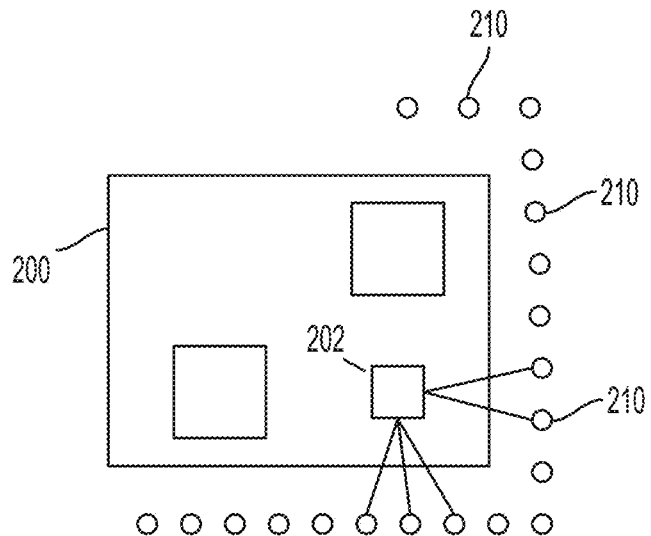
FIG. 2 contains an exemplary plan view of a series of photographic locations suitable to image a chosen structure.

Referring to the figures of the drawings, wherein like numerals of reference designate like elements throughout the several views and initially to FIGS. 1 and 2, there is provided a system and process 100 of creating, with manual and/or semi- or fully-automatic processing, a digital as-built site survey from a collection of digital images, which may be used for asset tracking or the like. The process 100 initially involves taking or acquiring one or more digital images, still frames or video images of the subject site 200 and/or structure 202 (step 105). In some cases, the structure 202 may be partially or completely inaccessible, such as a telecommunications tower, a refinery, a bridge, a street scene, an architectural work, etc. Generally speaking, the various embodiments taught herein would be useful in analyzing structures 202 that are too large to be measured by conventional means or are inaccessible partially or wholly to direct measurement. The digital images may be manually taken or acquired using an unmanned aerial vehicle (UAV). If the process is utilized with video images of the site 200 and the structure 202, video frames can be extracted and processed as provided herein. Preferably, the images will be high definition digital images (e.g., 24 MB digital images), but other arrangements are certainly possible (e.g., 4k or higher video images).

As is generally indicated in FIG. 2, each of the photographic positions 210 may be equally spaced apart. Generally, the three-dimensional location and camera orientation of each image will be determined by pre-surveying the points from which the images are to be taken or by using at least one reference object to accurately scale and orient each image of the site 200 and the structure 202. The series of images are then taken around the designated site 200 and structure 202 in steps 115, 120, and 125 in FIG. 1 and as generally illustrated in FIG. 2. The process 100 includes acquiring digital images with substantial overlap between successive images, e.g., as much as a 90% overlap, and in some embodiments, the images will be acquired in a 360° circle around the structure, e.g., equally distance from a central point. In other instances, the images will be acquired in a regular pattern at different distances from a central point, e.g., similar to the embodiment of FIG. 2. In other instances, the location of adjacent image positions will be arbitrary.

Turning now to FIGS. 3 through 6, one or more two-dimensional scaling reference objects 400 and/or one or more three-dimensional scaling reference objects 300 may be placed within the field of view of the camera so that the reference objects 300 and/or 400 are captured along with some or all of the images taken of the subject site and structure (step 110). The reference objects 300 and/or 400 allow the users to guarantee the accuracy of a 3D point cloud model and the subsequent drawings or other deliverables from the system 100. The reference objects 300 and/or 400 can be color coded to make it easier for tower technicians to know exactly what each reference objects 300 and/or 400 signifies and makes the scale immediately observable to the user's offsite computer-aided drafting (CAD) designers. The CAD designers use the locations of and measurement markings on the reference objects 300 and/or 400 in the images to create tie points and to accurately scale the final deliverable construction drawing/site plan. Using the reference objects 300 and/or 400, the process results in high-resolution imagery displays having extraordinary detail and precision so that the users are able to view fully interactive and explorable images from anywhere on a tower, compound or structure and can verify configurations, inventory and other information. The system and process 100 combines photogrammetry with 3D point cloud data taken directly from the structure site using the reference objects 300 and/or 400 so that users can identify points of interest for detailed structure modifications.

Figure 3:
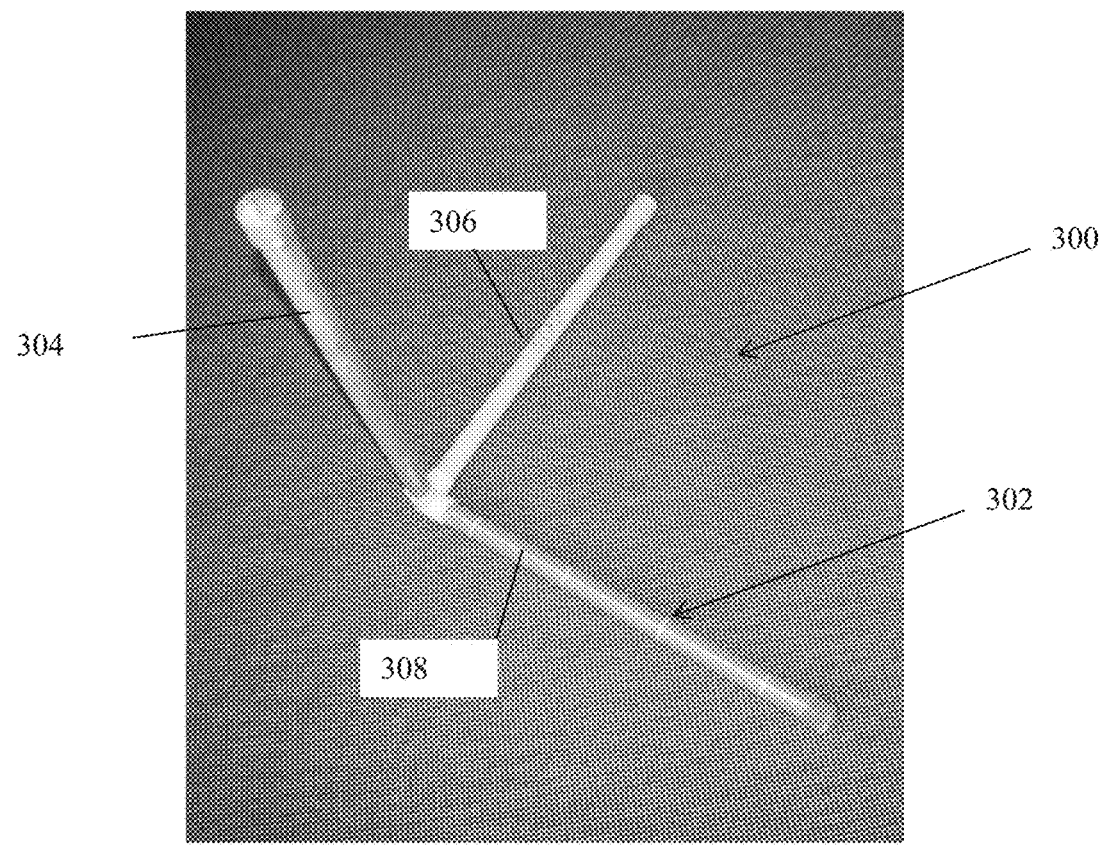
FIG. 3 is a perspective view of an example of a three-dimensional reference object for use in accordance with an illustrative embodiment of the invention disclosed herein.
Figure 4:
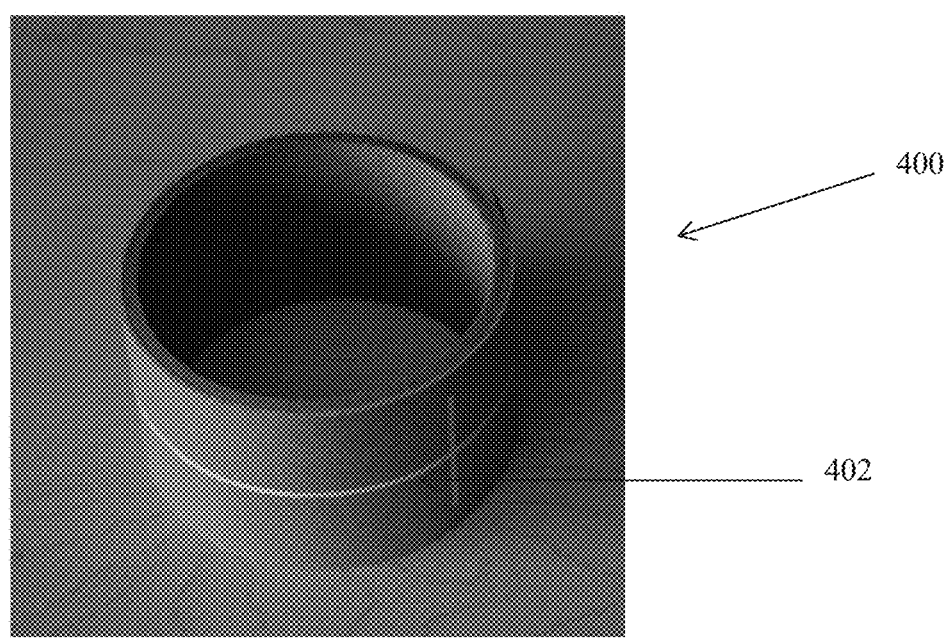
FIG. 4 is a perspective view of an example of a two-dimensional reference object for use in accordance with an illustrative embodiment of the invention disclosed herein.
Figure 5:
FIG. 5 is a perspective view of an example of a two-dimensional reference object shown in use in accordance with an illustrative embodiment of the invention disclosed herein.
Figure 6:
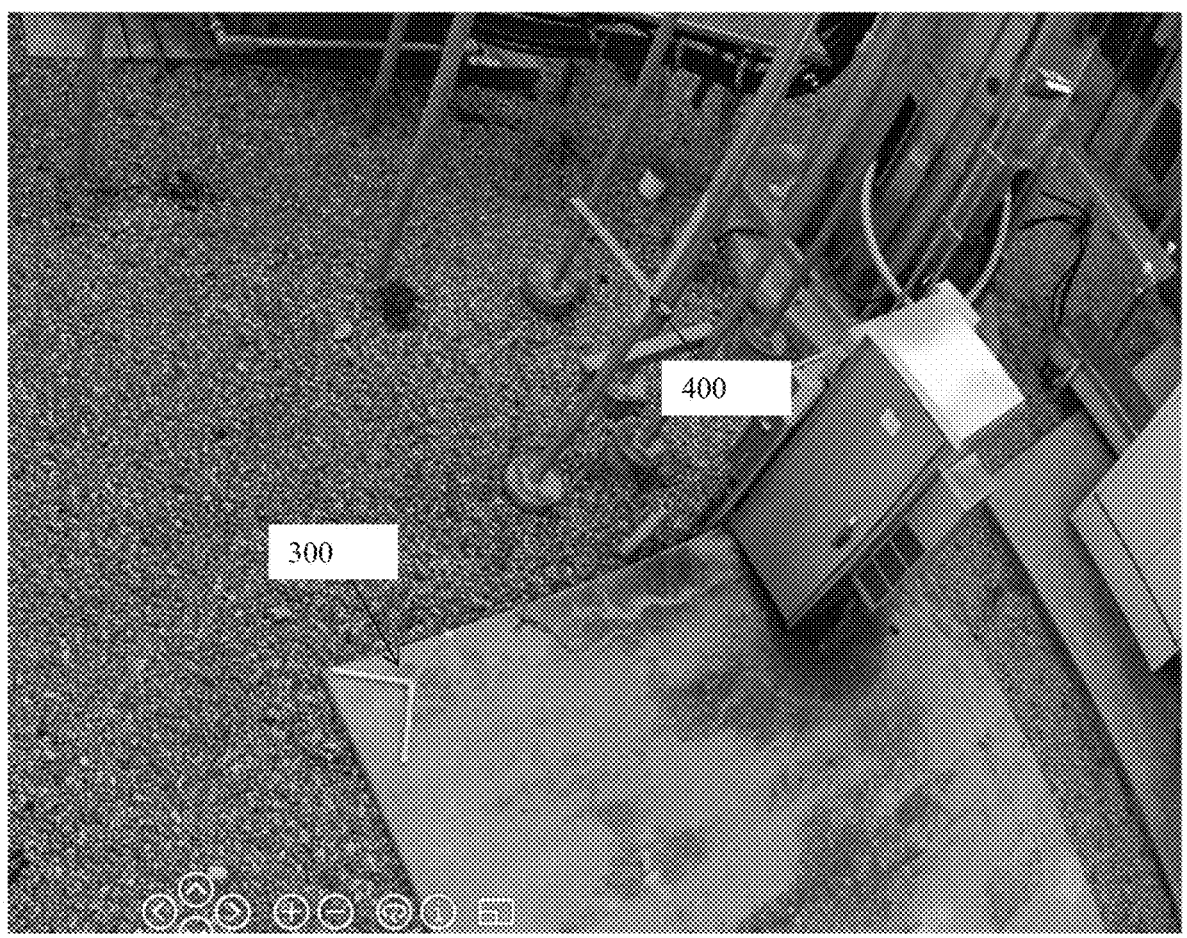
FIG. 6 is a perspective view of an example of a two-dimensional reference object and a three-dimensional reference object shown in use in accordance with an illustrative embodiment of the invention disclosed herein.
Figure 11:
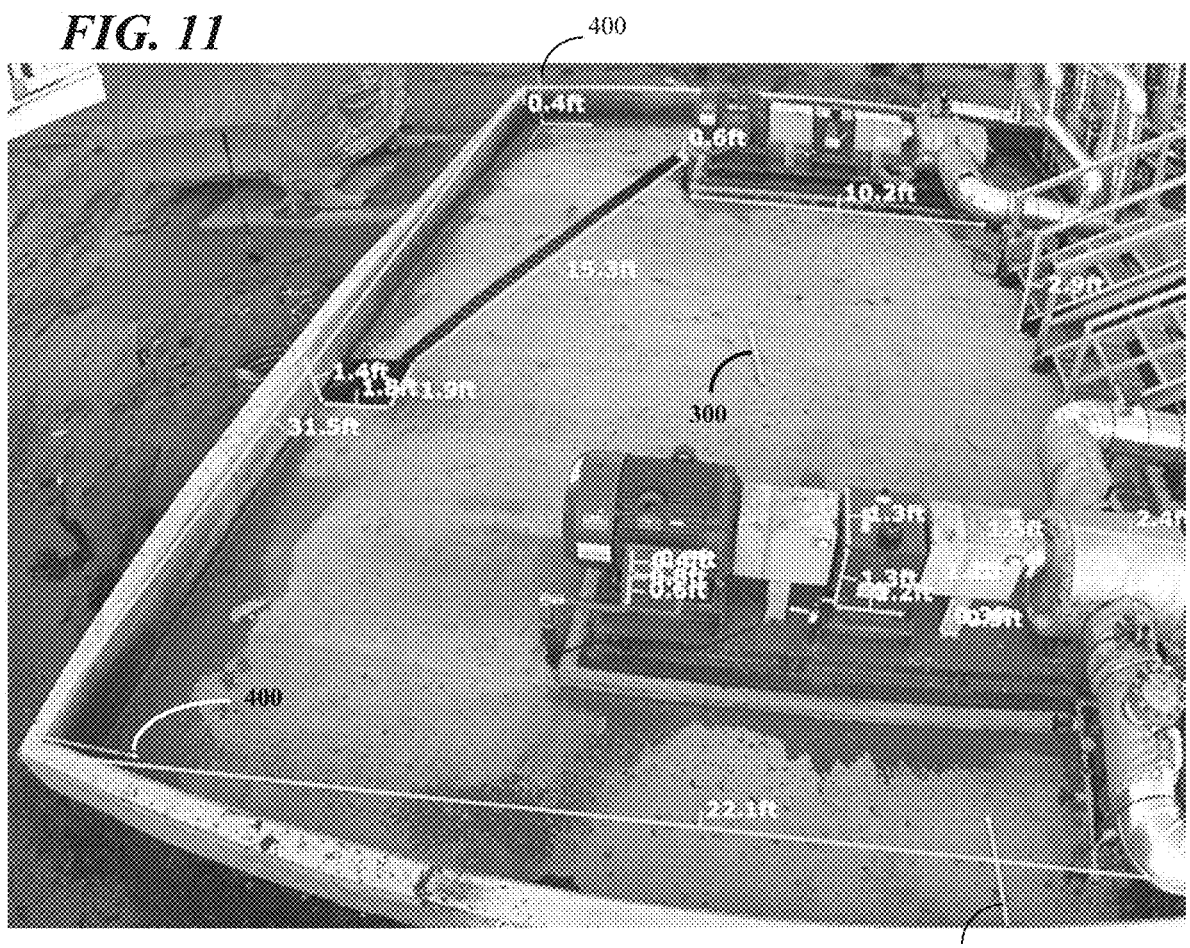
FIG. 11 is a perspective view of an example of a two-dimensional reference object and a three-dimensional reference object in an annotated image produced in accordance with an illustrative embodiment of the invention disclosed herein.

The two-dimensional reference objects 400 may be configured as tape measures, bars, sticks and/or rods (e.g., tape 400 in FIGS. 4 and 6, the stick 400 in FIG. 5, and rods 400 in FIG. 11), and the three-dimensional reference objects 300 may be configured as scaling rigs (e.g., scaling rig 300 in FIG. 3 and scaling rigs 615 in FIGS. 6 and 11). As exemplified in FIG. 3, the reference object or scaling rig 300 may be a construct with three poles 304, 606, and 308, each of known length joined together and oriented at right angles to each other to form a three-dimensional axis with one of the poles 608, 610, and 612 pointing in each of the X, Y, and Z directions. The reference objects 300 and/or 400 can also include incremental measurement marks 302 and 402, respectively, along a length and can be have a predetermined color (e.g., orange) to ensure the reference objects 300 and/or 400 are easily and clearly viable in the acquired images. In addition, one of the poles for designating a predetermined orientation (e.g., pointing north, south, etc.) on the scaling rig 300 can be specially color coded (e.g., yellow pole 306) to aid in its placement at the site. The reference objects 300 and/or 400 should be present in one, or preferably all, of the acquired images of the site to assist in the determination of the dimensions of the structure as discussed below. For example, as illustrated in FIG. 11 one or more rods 400 can be spread throughout the site, and/or as illustrated in FIG. 6 the scaling tape 400 can be vertically attached to the structure, in areas that will be imaged. In addition, one or more of the scaling rigs 300 can be positioned near the base of the structure and oriented with one of the poles (e.g., the yellow rod) pointing north as shown in FIGS. 6 and 11.

Figure 7:
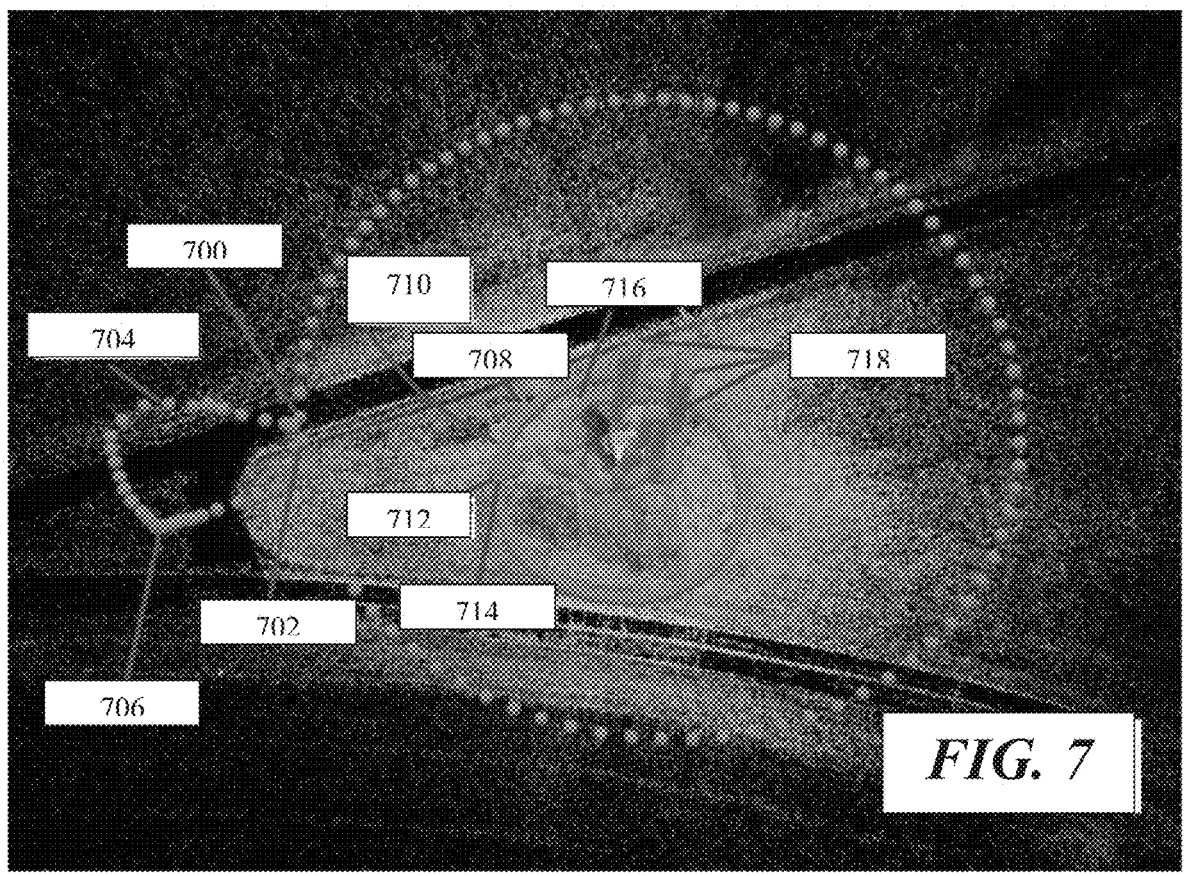
FIG. 7 is a top plan view of an example of an unmanned aerial vehicle total site scan of a self-support tower in accordance with an illustrative embodiment of the invention disclosed herein.

FIG. 7 provides a top-down view of an illustrative embodiment of an unmanned aerial vehicle total site scan of a self-support tower. As exemplified and not by way of limitation, the process initially includes starting location should be the direction of the fence signage (step 700), capturing an overall clockwise orbit of the entire structure from top to bottom in each image (step 702). Altitude of the UAV should be above overall tower height and looking down, e.g., 20°-25°, and the radius of this orbit should roughly be the height of the tower, e.g., 200' tower=200' radius. The process then transitions (step 704) from the overall scan to a scan of the access road (step 706) beginning about 10'-15' above the ground and slowly working in towards the site following any curvature that the road may have (step 708). The gimbal should have a down tilt, e.g., 20°-25°. The process can then continuously transition from acquiring images of the access road (step 710) to acquiring images of the subject site (step 712). The UAV can scan the site with a clockwise 360° orbit starting and ending at the front gate, and can maintain an altitude of about 15' above the ground (or an altitude necessary to safely avoid any obstacles) and a distance of about 15' outside the site. If the images are manually acquired, the technician should scan or "snake" up and down the structure while taking the images to ensure that there is sufficient overlap between the acquired photographic images. The process then continuously transitions (step 714) from acquiring images of the site to acquiring images of the reference objects 300 and/or 400 at the site and/or on the structure (step 716). The process can then acquire images of the tower face (step 718) by starting at Northern most face (or face closest to North in the clockwise direction) at about 20'-25' out from the structure, and climb vertically up the center of the face to above the top of the structure. The vertical climb and descent speeds of the UAV should be a pace that allows all objects on the structure to be captured in multiple images, e.g., at least four consecutive images. The UAV can then move clockwise to the nearest leg (leg should be centered in the frame), descend to the bottom of the structure, and then transition clockwise to next face of the structure. This process can be repeated for each additional face of the subject structure.

In the case of a telecommunications tower, the process can then proceed to the sectored frame. The mount orbit radius should be small such that the mount takes up most of the camera frame. It is critical that the process is able to view these mounts close up and clearly in order to enable the system to capture sizes and measurements of very small members and connection plates. From slightly above the mount, the UAV completes a 360° clockwise orbit, and then slowly descends below the mount while simultaneously angling the gimbal up. From slightly below the mount, the UAV complete another 360° clockwise orbit while slowly angling the gimbal back down. The UAV then descends to next sectored-frame and repeats the process as necessary before descending to bottom of the structure. Further, the process can include acquiring images (either by hand or with UAV) of an overall view of the tower showing entire structure, a plan view of the tower showing compound/fall area directly from above, any gate, fence, compound, building/shelter, and or tower signage, H-frame front and/or back, close-ups of any existing meters, nearest transformer (if located on pole, take picture of pole number), generator overall and close-up of tag, propane tank overall and close-up of tag, feed lines coming out of hatch plates, lines going up each tower face, and/or any additional images that a certain deliverable may require.

Turning back to FIG. 1, after the images have been acquired (or, in some cases during their acquisition), the images will be made accessible to a central server (step 130). Depending on the camera and the equipment associated with it, each image might be transferred wirelessly as it is required to the cloud where it can be accessed by the processing server later. In other cases, the images might be copied from the camera's memory card to the server wirelessly or by placing the memory card in direct communication with the server.

After the images have been made accessible to the server (step 130), the system processes the images (step 135) and prepares them for use in determining the edges of the site survey. For example, if the images are not completely horizontal they might be corrected for camera tilt. Moreover, distortion due to specific camera lenses must be taken into account either manually or automatically according to camera information embedded in digital image files. Once the camera is positioned and calibrated for each image, the three-dimensional coordinate of any point or image pixel can be calculated with a relatively high degree of accuracy using triangulation to define the same point in two images taken from different perspectives. Additionally, correction for lens distortion and exposure might be applied.

The user or the semi- or fully-automated algorithm will next identify the reference objects 300 and/or 400 within each image (step 140). Identification of the reference objects 300 and/or 400 will then allow, among others, items that have been photographed to be scaled as is discussed further below. Next, and if it has not been done already, the point-of-view of the camera when each image was taken will need to be determined (e.g., the position of X, Y, and Z coordinates) of the camera and its orientation (e.g., its elevation from the horizontal and the direction it was pointing; its angle with respect to the X and Y axes). While this information could be obtained directly from embedded data within the image file, the inventive system and process uses the reference objects 300 and/or 400 in order to create a 3D point cloud model with the dimensions of any item in the image to be accurately determined.

The process 100 can prepare the images using the scale-invariant feature transform (SIFT) algorithm or similar algorithm to select common feature points in two or more images, calculate camera positions, orientations, and distortions, and reconstruct three-dimensional information by intersecting feature point locations. In particular, the process 100 can semi-automatically select and match visual feature points, calculate camera positions, distortions, and orientations, and generate three-dimensional reconstructions of the image-captured structure(s) in the form of first three-dimensional point clouds.

Figure 8:
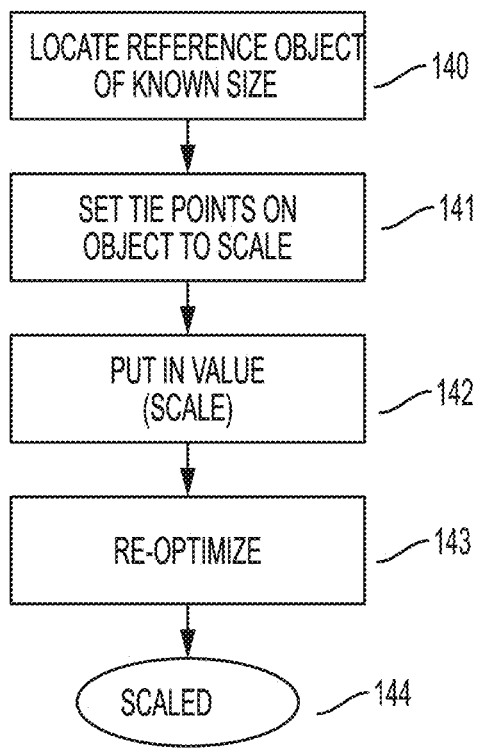
FIG. 8 is a flow chart illustrating exemplary logic for scaling selected features to obtain real world dimensions of those features from the digital images.
Figure 9:
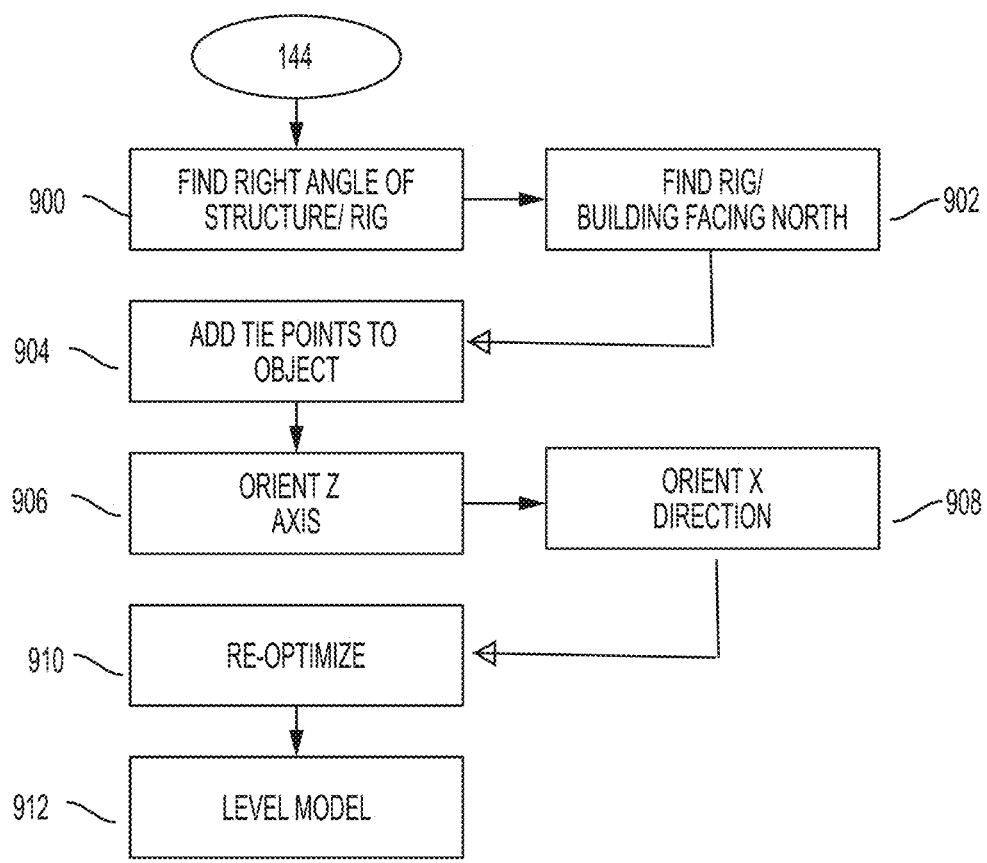
FIG. 9 is a flow chart illustrating an example of an operating logic suitable for use in accordance with an illustrative embodiment of the invention disclosed herein.

FIGS. 8 and 9 provide approaches wherein once the point cloud is complete (not densified), the system and process 100 locates the reference objects 300 and/or 400 (step 140) and then tie points of interest on each image file (step 141). The dimension of the reference objects 300 and/or 400 is input (step 142), and then the inventive process and system 100 densifies, recalibrates and readjusts the point cloud based on actual data (steps 143 and 144). The process and system 100 can be further optimized by leveling and orienting the point cloud model based on the reference objects 300 and/or 400. The right angle of the structure and/or the reference object 400 can be located (step 900) and the north facing pole can be located to orient the model (step 902). Then similar to FIG. 8, tie points can be added (step 904) to denote the Z orientation (step 906) and the X orientation (step 908) of the reference object 400. Then the inventive process and system 100 re-optimizes (step 910) and levels the point cloud based on the reference objects 300 and/or 400 (step 912).

Features of interest within the different images will be identified (step 155). This might comprise digitizing the edges, e.g., the corners/edges of structures, windows, machinery housings, pipes, curbs, frame works, etc., might be selected. This could be done manually by having the user select such features using a mouse together with custom software that recorded such selections (step 155). Then, given the foregoing, the real-world distance between any two selected points and their location in (X, Y, Z) space can be calculated (step 160). Further, these points may be joined/tied together to create one or more point cloud models with camera calibration, orientation, and point cloud (step 165).

Figure 10:
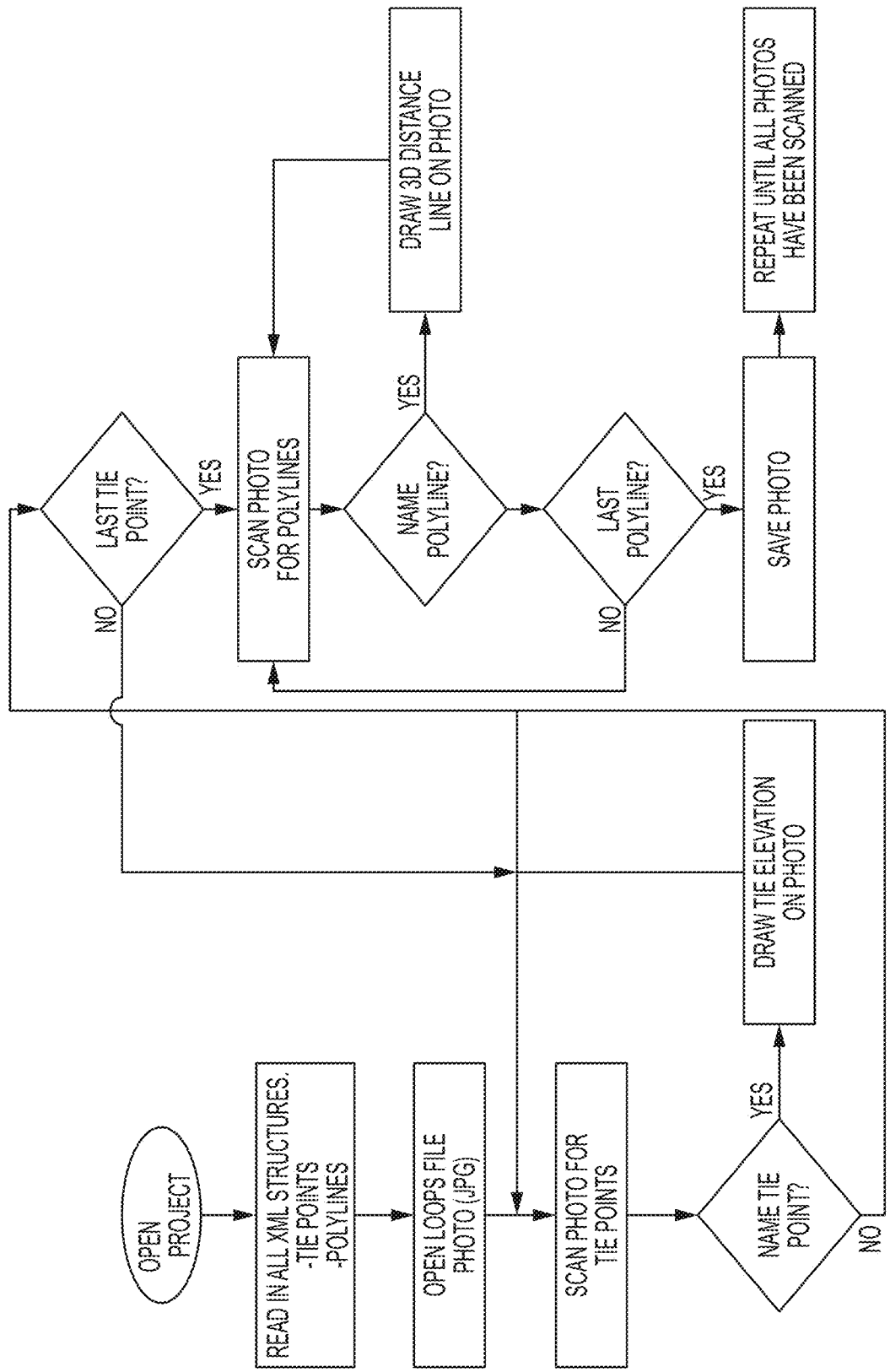
FIG. 10 is a flow chart illustrating an exemplary operating logic for annotating the features that have been identified in an image in accordance with an illustrative embodiment of the invention disclosed herein.

Finally, as exemplified in FIG. 10, the numerous digital images can be stitched together or otherwise combined to produce pseudo-three-dimensional view of the structure which the user can move through using a computer or mobile device as though physically viewing the structure from the different photographic locations (step 165). The selection and stitching of overlapping feature points between images can be achieved with varying levels of automation. Manual stitching of feature points generally requires fewer images but depends on some input of prior knowledge of the structure. In contrast, automated stitching requires a large number of images taken closely together to provide sufficient overlap and repetition of feature points. Preferably, the system and process 100 uses automated stitching to generate first point clouds (thousands rather than hundreds of points) thereby reducing the need for human intervention.

Figure 11A:
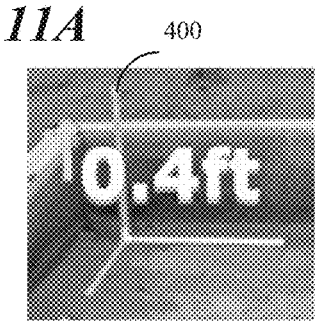
FIG. 11A is a close-up perspective view of the example of the three-dimensional reference object in the annotated image shown in FIG. 11.

After feature points (points of interest on the structure) are manually or automatically defined and stitched between two-dimensional images, camera positions and orientations are calculated based on corresponding collections of approximated three-dimensional feature point locations. Further, once the foregoing has been done, it is possible to annotate the as-built survey model with real-world lengths, widths, heights, areas, volumes, etc., and overlay those dimensions on each of the digital images. Still further, if the user selects a portion of the as-built survey model while it is viewed, some embodiments will return the exact dimensions of that particular element, to include lengths, widths, heights, areas, volumes, etc. (FIGS. 11 and 11A).

At this point in the process, the system 100 can flatten the three-dimensional as-built survey model to two-dimensional for sequential viewing with 360° view, zoom and other controls (step 165). The two-dimensional annotated images can include hot spots for particular equipment, etc. which may provide hyperlinks to additional details of the particular equipment, e.g., OEM, photograms, serial numbers, etc.

As used herein, the term "computer" may refer, but is not limited to a laptop or desktop computer, or a mobile device, such as a desktop, laptop, tablet, cellular phone, smart phone, personal media user (e.g., iPod), wearable computer, implantable computer, or the like. Such computing devices may operate using one or more operating systems, including, but not limited to, Windows, MacOS, Linux, UNIX, iOS, Android, Chrome OS, Windows Mobile, Windows CE, Windows Phone OS, Blackberry OS, and the like.

As used herein, the term "mobile device" may refer, but is not limited to any computer, as defined herein, that is not fixed in one location. Examples of mobile devices include smart phones, personal media users, portable digital assistants, tablet computers, wearable computers, implanted computers, and laptop computers.

The system and process described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The systems and/or processes described herein, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as .NET and C++, a lightweight data-interchange programming language such as JavaScript Object Notation (JSON) data-interchange format over HTTP POST request/response, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each process described above and combinations thereof may be embodied in computer executable code that, when executing on one or more computing devices, performs the steps thereof. In another aspect, the processes may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the disclosure.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference should not be construed that there is only one of that element.

It is to be understood that where the specification states that a component, feature, structure, or characteristic "may", "might", "can" or "could" be included, that particular component, feature, structure, or characteristic is not required to be included.

It is to be understood that were the specification or claims refer to relative terms, such as "front," "rear," "lower,"

"upper," "horizontal," "vertical," "above," "below," "up," "down," "top," "bottom," "left," and "right" as well as derivatives thereof (e.g., "horizontally," "downwardly," "upwardly" etc.), such reference is used for the sake of clarity and not as terms of limitation, and should be construed to refer to the orientation as then described or as shown in the drawings under discussion. These relative terms are for convenience of description and do not require that the apparatus be constructed or the process to be operated in a particular orientation.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Processes of the instant disclosure may be implemented by performing or completing manually, automatically, or a combination thereof, selected steps or tasks.

The term "process" may refer to manners, means, techniques and procedures for accomplishing a given task including, but not limited to, those manners, means, techniques and procedures either known to, or readily developed from known manners, means, techniques and procedures by practitioners of the art to which the invention belongs.

For purposes of the instant disclosure, the term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. Terms of approximation (e.g., "about", "substantially", "approximately", etc.) should be interpreted according to their ordinary and customary meanings as used in the associated art unless indicated otherwise. Absent a specific definition and absent ordinary and customary usage in the associated art, such terms should be interpreted to be ±10% of the base value.

When, in this document, a range is given as "(a first number) to (a second number)" or "(a first number)–(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a process comprising two or more defined steps, the defined steps can be carried out in any order or simultaneously (except where context excludes that possibility), and the process can also include one or more other steps which are carried out before any of the defined steps, between two of the defined steps, or after all of the defined steps (except where context excludes that possibility).

Still further, additional aspects of the instant invention may be found in one or more appendices attached hereto and/or filed herewith, the disclosures of which are incorporated herein by reference as if fully set out at this point.

Thus, the invention is well adapted to carry out the objects and attain the ends and advantages mentioned above as well as those inherent therein. While the inventive concept has been described and illustrated herein by reference to certain illustrative embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A computer-implemented process for generating a two-dimensional stitched and annotated digital image of a site having at least one as-built structure thereon, said process comprising the steps of:
   a. acquiring a plurality of digital images, still frames and/or video images of said site, said structure, or both said site and said structure; said plurality of digital images comprising one or more reference objects positioned on or about said site, said structure, or both said site and said structure; each of said reference objects configured to accurately scale and orient said plurality of digital images; said reference objects further comprising a two-dimensional scaling reference object a three dimensional scaling reference object or a combination thereof; wherein said two-dimensional scaling reference object is color coded, has a predetermined length, and has a predetermined orientation; wherein said three-dimensional scaling reference object is a scaling rig comprising a plurality of poles respectively oriented along an X, Y and Z axis, wherein each pole of said scaling rig is color coded designating a predetermined orientation and has one or more measurement marks thereon;
   b. photogrammetrically generating a three-dimensional point cloud of said site, said structure, or both said site and said structure from said digital images;
   c. identifying one or more of said reference objects in said three-dimensional point cloud;
   d. identifying one or more features of said site, said structure, or both said site and said structure in said three-dimensional point cloud; and
   e. generating said two-dimensional stitched and annotated digital image of said site, said structure, or both said site and said structure from said identified one or more reference objects, said identified one or more features, or both in said three-dimensional point cloud.

2. The process of claim 1 wherein said structure is a telecommunications tower, a refinery, a bridge, a street scene, an architectural work, or a combination thereof.

3. The process of claim 1 further comprising the step of placing each of said reference objects on or around said site, said structure, or both said site and said structure such that each of said reference objects is captured in some or all of said digital images acquired of said site, said structure, or both said site and said structure.

4. The process of claim 1 wherein said two-dimensional scaling reference object is a linear tape measure, bar, stick, rod, or combination thereof having one or more measurement marks thereon.

5. The process of claim 1 further comprising the steps of:
electronically selecting common feature points in two or more of said digital images;
calculating camera positions, orientations, and distortions; and
generating a first three-dimensional point cloud of said site, said structure, or both said site and said structure in said digital images.

6. The process of claim 5 further comprising the step of densifying, leveling and orienting said first three-dimensional point cloud based on said identified one or more of said reference objects, on said identified one or more features, on one or more identified tie points, or a combination thereof to generate a second three-dimensional point cloud.

7. The process of claim 6 wherein said step of generating said two-dimensional stitched and annotated digital image further comprises the steps of:
electronically stitching said digital images together based on said identified one or more reference objects or said identified one or more features in said first three-dimensional point cloud or both;
electronically annotating said second three-dimensional point cloud with actual dimensions and other information specifically relating to said site, said structure, or both said site and said structure; and
electronically flattening said annotated second three-dimensional point cloud to said two-dimensional stitched and annotated digital image for sequential viewing.

8. A computer-implemented process of using photogrammetry for generating a two-dimensional stitched and annotated digital image, said process comprising the steps of:
a. selecting a site having at least one as-built structure thereon;
b. providing a two-dimensional scaling reference object, a three-dimensional scaling reference object or a combination of both configured to be placed on or around said site, said structure, or both said site and said structure; wherein said two-dimensional scaling reference object is color coded and has a predetermined length, a predetermined orientation, and a plurality of measurement markings thereon; wherein said three-dimensional scaling reference object comprises a plurality of color-coded poles designating a predetermined orientation and configured to be respectively oriented along an X, Y and Z axis;
c. acquiring a plurality of digital images, still frames and/or video images of said site, said structure, or both said site and said structure; some or all of said plurality of digital images including at least one of said reference objects; each of said reference objects configured to accurately scale and orient said plurality of digital images of said site, said structure, or both said site and said structure;
d. electronically communicating said plurality of digital images to a central server;
e. generating a first three-dimensional point cloud of said site, said structure, or both said site and said structure in said digital images;
f. identifying one or more of said reference objects in said first three-dimensional point cloud;
g. identifying one or more features of said site, said structure, or both said site and said structure in said first three-dimensional point cloud;
h. generating a second three-dimensional point cloud based on said identified one or more reference objects in said first three-dimensional point cloud, on said identified one or more features of said site, said structure, or both said site and said structure in said first three-dimensional point cloud, or a combination thereof; and
i. generating said two-dimensional stitched and annotated digital image of said site, said structure, or both said site and said structure from said second three-dimensional point cloud.

9. The process of claim 8 wherein said structure is a telecommunications tower, a refinery, a bridge, a street scene, an architectural work, or a combination thereof.

10. The process of claim 8 wherein each of said plurality of digital images is acquired manually or using an unmanned aerial vehicle.

11. The process of claim 8 wherein said step of acquiring said plurality of digital images further comprises acquiring said plurality of digital images of said site, said structure, or both said site and said structure with substantial overlap between successive digital images, still frames and/or video images.

12. The process of claim 11 wherein substantial overlap is about 90% overlap between said successive digital images, still frames and/or video images.

13. The process of claim 8 further comprising the step of placing each of said reference objects on or around said site, said structure, or both said site and said structure such that each of said reference objects is captured some or all of said digital images acquired of said site, said structure, or both said site and said structure.

14. The process of claim 8 wherein each of said two-dimensional scaling reference objects is a linear tape measure, bar, stick, rod, or combination thereof.

15. The process of claim 8 wherein said three-dimensional scaling reference objects further comprises a scaling rig having one or more measurement marks thereon.

16. The process of claim 8 further comprising the step of electronically calibrating and correcting said digital images for tilt, exposure, distortion, or a combination thereof.

17. The process of claim 8 further comprising the steps of:
electronically selecting common feature points in two or more of said digital images;
calculating camera positions, orientations, and distortions; and
generating said first three-dimensional point cloud of said site, said structure, or both said site and said structure in said digital images.

18. The process of claim 8 wherein said step of generating said first three-dimensional point cloud further comprises the step of leveling and orienting said first three-dimensional point cloud based on said identified one or more of said reference objects, on said identified one or more features, on one or more identified tie points, or a combination thereof.

19. The process of claim 8 wherein said step of generating said two-dimensional stitched and annotated digital image further comprises the steps of:
electronically stitching said digital images together based on said identified one or more reference objects or said identified one or more features in said first three-dimensional point cloud or both;
electronically annotating said second three-dimensional point cloud with actual dimensions and other information specifically relating to said site, said structure, or both said site and said structure; and
electronically flattening said annotated second first three-dimensional point cloud to said two-dimensional stitched and annotated digital image for sequential viewing.

20. The process of claim 8 wherein said two-dimensional stitched and annotated digital image is configured to be viewable on an internet browser of a mobile device or a computer.

21. The process of claim 20 wherein said two-dimensional stitched and annotated digital image further comprise electronic hyperlinks for additional informational details of said site, said structure, or both said site and said structure.

* * * * *